US008815784B2

(12) United States Patent
Ogle et al.

(10) Patent No.: US 8,815,784 B2
(45) Date of Patent: Aug. 26, 2014

(54) HIGH MOLECULAR WEIGHT LOW POLYDISPERSITY POLYMERS

(75) Inventors: James W. Ogle, Duncan, OK (US); Charm Boontheung, Duncan, OK (US); Rajesh K. Saini, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 232 days.

(21) Appl. No.: 13/333,377

(22) Filed: Dec. 21, 2011

(65) Prior Publication Data

US 2013/0157902 A1 Jun. 20, 2013

Related U.S. Application Data

(63) Continuation of application No. 13/331,441, filed on Dec. 20, 2011.

(51) Int. Cl.
*C09K 8/588* (2006.01)
(52) U.S. Cl.
USPC .......................... 507/120; 507/225; 166/305.1
(58) Field of Classification Search
None
See application file for complete search history.

(56) References Cited

U.S. PATENT DOCUMENTS

| | | | | |
|---|---|---|---|---|
| 4,779,680 A * | 10/1988 | Sydansk | ........................ | 166/300 |
| 4,960,465 A * | 10/1990 | Arfaei | ........................... | 106/724 |
| 6,025,304 A * | 2/2000 | Southwell et al. | ............ | 507/225 |
| 6,143,820 A | 11/2000 | Klier et al. | | |
| 6,380,335 B1 | 4/2002 | Charmot et al. | | |
| 7,026,414 B1 | 4/2006 | Barron et al. | | |
| 7,131,493 B2 | 11/2006 | Eoff et al. | | |
| 7,186,786 B2 | 3/2007 | McCormick et al. | | |
| 7,402,690 B2 | 7/2008 | McCormick et al. | | |
| 7,718,432 B2 | 5/2010 | Scales et al. | | |
| 2004/0035331 A1* | 2/2004 | Volpert | ........................ | 106/810 |
| 2005/0143546 A1* | 6/2005 | Matyjaszewski et al. | .... | 526/347 |
| 2006/0258826 A1* | 11/2006 | Matyjaszewski et al. | .... | 526/347 |
| 2008/0058234 A1* | 3/2008 | Morishita et al. | ............. | 508/469 |
| 2013/0157901 A1 | 6/2013 | Ogle et al. | | |

FOREIGN PATENT DOCUMENTS

| | | |
|---|---|---|
| WO | 02079269 A1 | 10/2002 |
| WO | 2013095805 A1 | 6/2013 |
| WO | 2013095806 A1 | 6/2013 |

OTHER PUBLICATIONS

Hunter et al, Kinetics and mechanism of tetrahydrofuran synthesis via 1,4-butanediol dehydration in high temperature water, J. Org. Chem. 2006, 71, 6229-6239.*
Tsuchiya et al., "Macromolecules," 44 (13), pp. 5200-5208; 2011.
International Search Report and Written Opinion for PCT/US2012/064611 dated Feb. 7, 2013.

* cited by examiner

*Primary Examiner* — Alicia Bland
(74) *Attorney, Agent, or Firm* — McDermott Will & Emery LLP; Craig W. Roddy

(57) ABSTRACT

The present invention relates to synthetic polymers having high molecular weights and low polydispersities and methods of synthesis. In one embodiment of the present invention, a polymer includes a polyacrylate polymer obtained from a polymerization reaction in which the polyacrylate polymer has a molecular weight of at least about 500,000 and a polydispersity index of about 1.25 or less.

12 Claims, 2 Drawing Sheets

HIGH MOLECULAR WEIGHT LOW POLYDISPERSITY POLYMERS

CROSS-REFERENCE TO RELATED APPLICATIONS

This application is a continuation of U.S. patent application Ser. No. 13/331,441 filed on Dec. 20, 2011, entitled "High Molecular Weight Low Polydispersity Polymers, currently pending.

BACKGROUND

The present invention relates to synthetic polymers, and more particularly, to synthetic polymers having high molecular weights and low polydispersities and methods of synthesis and use thereof.

Polymers have extraordinary ranges of properties that make them useful for a number of applications. For example, polymers can be used as large scale structural materials (e.g., carbon fiber reinforced thermoset polymers used in airplanes) as well as high value-added ingredients on the scale of grams (e.g., lithography, drug delivery, etc.). Polymers are also widely used in everyday applications. Some of these uses include, but are not limited to, disposable packaging, paper, film, tubing, and the like.

The versatility of polymers, in particular synthetic polymers, may be a direct result of the versatility in their physical properties, which in turn reflects the advances in molecular synthesis and design over the years. In other words, synthetic polymers have numerous tunable properties that allow for their expanding use across various technology platforms. These tunable properties may be optimally tapped once the polymer is sufficiently large and/or have a sufficiently narrow distribution of molecular mass.

Currently, some of the main desired goals of synthetic polymer chemistry include achieving high degrees of control over polymer architecture like polymer length, creation of well-defined diblock (or polyblock) copolymers, creation of specifically branched structures (e.g., star polymers, dendritic polymers, brush polymers, and self-assembled polymers), and design of these systems at increasingly large sizes. For example, it is believed that current methods are limited to the synthesis of block copolymers having individual block sizes between about 10 kDa and about 100 kDa in molecular weight.

While there are many different types of synthetic polymers, synthesis generally involves a polymerization reaction in which monomer molecules react to form a multi-dimensional network of polymer chains. Examples of known polymerization reactions include ring-opening polymerization, addition polymerization (e.g., living polymerization), condensation, etc.

One of the main limitations of current polymerization techniques is that individual polymer chains rarely have the same degree of polymerization and molar mass. In other words, polymerization reactions typically generate a distribution of polymer sizes around an average value. In some cases, this heterogeneity is undesirable. For example, the performance of even relatively small polymers such as photoresists and polyacrylate detergents (~5000 MW) goes up as the polydispersity index (PDI) goes down. It is also generally believed that increasing polymer chain length improves many physical properties, notably the mechanical characteristics. However, the technical challenges of synthesizing low PDI polymers typically become more pronounced as one attempts to synthesize larger polymers.

As used herein, "polydispersity index" refers to a measure of the distribution of molecular mass in a given polymer sample. The polydispersity index is calculated by dividing the weight average molecular weight (Mw) by the number average molecular weight (Mn). As used herein, the term "weight average molecular weight" generally refers to a molecular weight measurement that depends on the contributions of polymer molecules according to their sizes. As used herein, the term "number average molecular weight" generally refers to a molecular weight measurement that is calculated by dividing the total weight of all the polymer molecules in a sample with the total number of polymer molecules in the sample. These terms are well-known by those of ordinary skill in the art.

Conventional polymerization methods typically cannot produce or have trouble producing high molecular weight (those above about 500,000) polymers that have low PDIs (typically less than about 1.25). Polymers with molecular weights that exceed $10^6$ g/mol are typically referred to as ultra-high molecular weight (UHMW) polymers. Examples of UHMW that have been synthesized include, but are not limited to, polyethylene, polypropylene, polyisobutylene, polyacrylamide, polyisoprene, poly(ethyleneoxide), polystyrene, poly(vinylacetate), and the like.

Living polymerization is a technique that is often used to synthesize polymers that have low PDIs. This technique employs the use of living polymerization systems, such as organometallic systems in atom transfer radical polymerization (ATRP), nitrogen-mediated polymerization (NMP), or chain transfer agents (e.g., thiols, halocarbons, etc.) in reversible addition-fragmentation chain transfer (RAFT), in order to achieve narrow polymer length dispersities. A living polymerization reaction generally involves forming terminal groups that can be used to polymerize other monomers. FIG. 1 (bottom) shows an example of a living polymerization reaction, in which each polymerization step is protected. FIG. 1 (top) also shows an example of a conventional free-radical polymerization reaction, in which unprotected radicals are generated after each polymerization step. Thus, one of the characteristics of living polymerization is that the ability of a growing polymer chain to terminate has been removed.

Polydispersity index can be used to characterize or describe the effectiveness of a living polymerization reaction. For example, a PDI of 1 indicates a highly homogeneous reaction in which each polymer chain is identical in length. Generally, PDI values increase as a reaction product becomes more heterogeneous. Certain reactions such as free radical polymerization are often difficult to control and form polymers that have a wide range of sizes. A PDI of 1.50 represents the "ideal" free radical polymerization that is performed in infinitely dilute conditions. These reactions usually occur at lower conversion rates.

Currently, living polymerization techniques are usually limited to polymers that are around 200 kDa and PDIs typically on the order of 1.5 or greater. Yet another drawback of living polymerization is that the technique is typically performed in organic solvents using environmentally caustic reagents that are difficult to remove.

SUMMARY OF THE INVENTION

The present invention relates to synthetic polymers, and more particularly, to synthetic polymers having high molecular weights and low polydispersities and methods of synthesis and use thereof.

In some embodiments, the present invention provides polymers comprising: a polyacrylate polymer obtained from a polymerization reaction wherein the polyacrylate polymer has a molecular weight of at least about 500,000 and a polydispersity index of about 1.25 or less.

In other embodiments, the present invention provides subterranean fluids comprising: a base fluid; and a polyacrylate polymer that has a molecular weight of at least 500,000 and a polydispersity index of about 1.25 or less.

In still other embodiments, the present invention provides polyacrylate polymer products prepared by processes comprising: dissolving acrylate monomers in a fluid media comprising an olefin-containing polyalcohol amide surfactant; and initiating a polymerization reaction of the acrylate monomers with a polymerization initiator to produce a polymer having a molecular weight of at least about 500,000 and a polydispersity index of about 1.25 or less.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
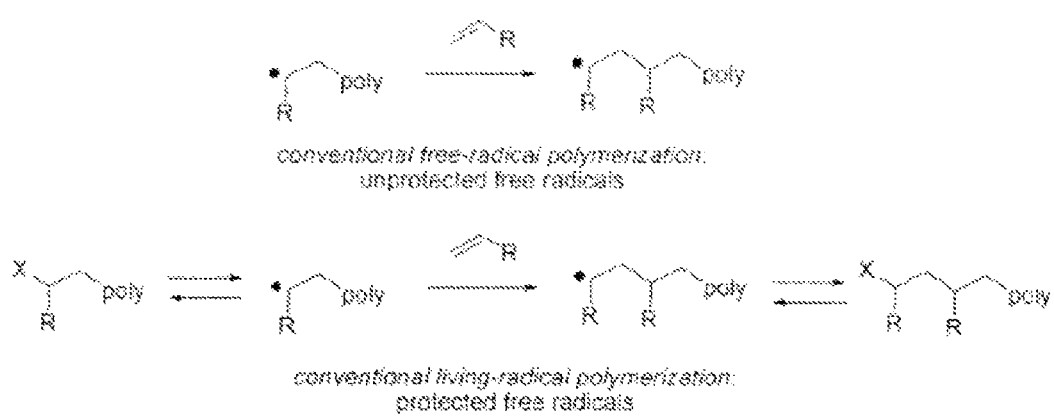
FIG. 1 shows an example of a free-radical and a living polymerization reaction.

The present invention relates to synthetic polymers, and more particularly, to synthetic polymers having high molecular weights and low polydispersities and methods of synthesis and use thereof.

There are a number of advantages related to the present invention. The present invention provides compositions and methods for synthesizing high molecular weight polymers that have extremely narrow distribution of sizes. These polymers are referred to as "high molecular weight low PDI polymers." It is believed that the present invention provides high molecular weight (>500,000) low PDI (<1.25) polymers that would otherwise be unavailable or difficult to synthesize.

The high molecular weight low PDI polymers of the present invention may be particularly useful in high threshold molecular weight applications. Such applications may exist in fields such as, but not limited to, energy, oil and gas applications, biomedical applications, materials research, organic electronics, and others. Typically, in these applications, an important characteristic or property of the polymer does not become apparent until a lower limit for molecular weight has been reached. For example, the stability, strength, and performance of high molecular weight acrylamide polymers may make them useful for treatments of high permeability subterranean formations once a certain average molecular weight is attained (typically >500,000).

It is believed that the high molecular weight low PDI polymers of the present invention may have superior physical properties. Generally, polymers have superior properties (improved tensile strength, impact resistance, and melt viscosity) as their molecular weight increases. Consequently, high molecular weight low PDI polymers may be particularly useful for a number of roles including, but not limited to, coating materials, viscosifiers, friction reducers, fluid-loss materials, analytical standards membranes for water gas or oil purification or separation, rheology modifier, suspending aids, water block agents, fracturing fluid, gravel packing fluid, and the like. They may also act as better thermoplastic materials with improved mechanical properties as well as better elastomers with defined properties. These polymers may also be useful in applications such as, but not limited to, drug delivery, cosmetics, membranes, lithography, and the like.

The present invention also provides for the use of cost-effective chain transfer agents in the synthesis of high molecular weight low PDI polymers. In some embodiments, the conversion rate will also be very high (e.g., greater than about 85%). Thus, the methods of the present invention may provide cost advantages over existing polymerization methods.

Without being limited by theory, it is believed that during polymerization, the ends of the polymers are capped, forming "captured radicals" that can be restarted under proper conditions. It is believed that this feature of the present invention is particularly useful for forming diblock copolymers with very high Mw diblock character. It is believed that the present invention provides polymers and methods of synthesizing block copolymers having individual block sizes roughly 10 times larger than currently available methods (typically greater than about 100 kDa to about 1,000 kDa).

The methods of the present invention may also generate high molecular weight low PDI polymers without the use of organic solvents. Typically, organic solvents are difficult to remove and may pose health and/or environmental hazards. The present invention also does not require the use of metal initiators. Consequently, the methods of the present invention may provide environmental benefits over existing polymerization methods as well as reduce the number of steps required in the manufacture of high molecular weight low PDI polymers.

The present invention provides polymers comprising: a polyacrylate polymer obtained from a polymerization reaction wherein the polyacrylate polymer has a molecular weight of at least about 500,000 and a polydispersity index of about 1.25 or less. A polyacrylate polymer is usually synthesized from a polymerization reaction of suitable monomers. In some embodiments, the polyacrylate polymer may have a molecular weight of no more than about 5,000,000.

In some embodiments, the polyacrylate polymer is a product of a polymerization reaction of an acrylate monomer comprising an acrylate monomer or an acrylate-based monomer selected from the group consisting of: an acrylamide, an acrylic acid, a methacrylic acid, an ethacrylic acid, a methyl methacrylate, a methacrylate, an acrylonitrile, a methyl acrylate, an ethyl acrylate, a 2-ethylhexyl acrylate, a hydroxyethyl methacrylate, a butyl acrylate, a butyl methacrylate, an acrylate ester, an acrylamide amide, a styrene, a vinyl, an olefin, any derivative thereof, and any combination thereof.

In some embodiments, the polyacrylate polymer is a copolymer derived from two or more monomers. In some embodiments, the copolymer may be a block copolymer such as, but not limited to, diblock, triblock, and the like. In some embodiments, the individual block sizes can range from about 100 kDa to about 1,000 kDa, preferably from about 200 kDa to about 1,000 kDa. The exact method used to form copolymers will depend on factors such as, but not limited to, the desired molecular weight and/or degree of branching. Such factors should be apparent to those of ordinary skill in the art.

The polyacrylate polymers may generally have any crosslinked structure including, but not limited to, graft, star, brush, dendritic architectures, hyperbranched polymers, and the like. More specific examples of suitable polymer structures include, but are not limited to, linear macromolecular brushes, star brush copolymers, gradient brush copolymers, brush block copolymers, heterografted brush copolymers, double grafted brush copolymers, and the like.

The polyacrylate polymers may be prepared by processes comprising: dissolving acrylate monomers in a fluid media comprising an olefin-containing polyalcohol amide surfactant; and initiating a polymerization reaction of the acrylate monomers with a polymerization initiator to produce a polymer having a molecular weight of at least about 500,000 and a polydispersity index of about 1.25 or less.

In some embodiments, the fluid media may be aqueous or multi-phased. Suitable examples of multi-phase fluid media include, but are not limited to, a fluid comprising an aqueous and organic phase, a suspension of water and solid particles, an emulsion, and the like. In some embodiments, the polymerization reaction takes place at about 20° C. to about 80° C.

In some embodiments, the olefin-containing polyalcohol amide surfactant comprises a surfactant selected from the group consisting of: amide with an N-alkyl alcohol or two N-alkyl alcohols, sorbitan trioleate, sorbitan mono-oleate, and any combination thereof. Without wishing to be limited by theory, it is believed that olefin-containing polyalcohol amide surfactants are excellent chain transfer agents in polymerization reactions. In some embodiments, the olefin-containing polyalcohol amide surfactant is present in an amount of about 0.1% to about 10% by weight of the fluid media.

As used herein, the terms "initiator," "initiating," or other related terms do not necessarily imply a specific order of events that occur during a polymerization reaction. In some embodiments, the polymerization initiator comprises an initiator selected from the group consisting of: an azo initiator, a persulfate initiator, a peroxide initiator, a hydroperoxide initiator, a redox initiator, a thiosulfate initiator, a photoinitiator, and any combination thereof. Persulfate initiators include, but are not limited to, an ammonium persulfate, a potassium persulfate, a sodium persulfate, and the like. Organic peroxides or hyperoxides include, but are not limited to, a hydrogen peroxide, a tertiary-butyl hydroperoxide, and the like. Azo initiators include, but are not limited to, a 2,2'-Azobis(2-methylpropionitrile), which is water-soluble and the like. Examples of commercially available water-soluble azo initiators include VA-044, VA-046B, VA-50, VA-057, VA-060, VA-061, VA-67, VA-80, VA-86, etc. and commercially available oil-soluble azo initiators include V-70, V-65, V-59, V-40, etc., which are available from Wako Chemicals USA, Richmond, Va. Redox initiators include, but are not limited to, potassium persulfate ($K_2S_2O_8$)/sodium thiosulfate ($Na_2S_2O_3$), ceric ammonium nitrate and a reducing agent and the like. In some embodiments, the polymerization initiator is present in an amount of about 0.001% to about 0.1% by weight of the fluid media. The present invention provides a method of polymerizing comprising: dissolving acrylate or acrylate-based monomers in a fluid media comprising an olefin-containing polyalcohol amide surfactant; and initiating a polymerization reaction of the acrylate or acrylate-based monomers with a polymerization initiator to produce a polymer having a molecular weight of at least about 500,000 and a polydispersity index of about 1.25 or less.

The present invention provides subterranean fluids comprising: a base fluid; and a polyacrylate polymer that has a molecular weight of at least 500,000 and a polydispersity index of about 1.25 or less. Optionally, the subterranean fluid may further comprise an additive selected from the group consisting of: a fluid loss control agent, a clay inhibitor, a lubricant, a weighting agent, a bentonite-based viscosifier, and any combination thereof. In some embodiments, the base fluid may be aqueous, oil-based, or synthetic.

In some embodiments, the subterranean fluid may be a fracturing fluid, a drilling fluid, or a cementing fluid. While at least one embodiment described herein is related to subterranean fluids, the polyacrylate polymers of the present invention may be generally added to any fluids.

The polyacrylate polymer may be used for any purpose that is compatible with one or more embodiments disclosed herein. For example, in some embodiments, the polyacrylate polymer may be a cementing additive added to the subterranean treatment fluid. In some embodiments, the polyacrylate polymer may be a proppant coating.

The present invention provides methods comprising: providing a treatment fluid comprising: a base fluid; and a polyacrylate polymer having a molecular weight of at least 500,000 and a polydispersity index of about 1.25 or less; and placing the treatment fluid in a subterranean formation.

The present invention provides methods comprising: providing a fracturing fluid comprising: a base fluid; a polyacrylate polymer having a molecular weight of at least 500,000 and a polydispersity index of about 1.25 or less; and introducing the fracturing fluid in the subterranean formation at a rate sufficient to create or enhance fractures in the subterranean formation; and injecting a proppant into the fractures. Optionally, the fracturing fluid may further comprise an additive selected from the group consisting of: an acid, a biocide, a breaker, a clay stabilizer, a corrosion inhibitor, a crosslinker, a friction reducer, a gelling agent, an iron control agent, a scale inhibitor, a surfactant, and any combination thereof.

In some embodiments, the proppant comprises a proppant selected from the group consisting of: sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof.

To facilitate a better understanding of the present invention, the following examples of preferred embodiments are given. In no way should the following examples be read to limit, or to define, the scope of the invention.

EXAMPLE 1

In this Example, polymerization reactions involving acrylamide monomers were performed and characterized. In a typical reaction, acrylamide (5.0 g) was dissolved in deionized water (40 g). A batch of cocadi(methyl) amide (commercially available as AMADOL® from Akzo-Nobel), sorbitan trioleate (commercially available as SPAN™ 85 or SPAN™ 80 from BASF), isopentane (commercially available as EXXSOL from ExxonMobil Chemicals), or alcohol ethoxylate (commercially available as ETHYLAN 25-3 from Akzo-Nobel) was then added to the reaction and degassed for 20 minutes with argon. Next, ammonium persulfate initiator (100 mg) was added and the closed reaction was heated in an oil bath at 45° C. for 2 hours. The reaction product (a thick solution) was then analyzed by gel permeation chromatography (GPC), multiangle laser light scattering (MALLS), and quasi-elastic laser scattering (QELS). The results are summarized in Table 1 which shows the amount of surfactant used, conversion rate of the polymerization reaction, number average molecular weight (Mn), weight average molecular weight (Mw), and PDI.

TABLE 1

Individual Surfactant Tests.

| # | Surfactant/ Additive and Batch | Amount Added (g) | Conversion (%) | Mn ($10^6$) | Mw ($10^6$) | PDI |
|---|---|---|---|---|---|---|
| 1 | AMADOL ®, old | 0.224 | 28.1 | 2.84 | 3.2 | 1.13 |
| 2 | AMADOL ®, new | 0.224 | 24.4 | 2.34 | 2.87 | 1.23 |
| 3 | SPAN ™ 85, old | 0.26 | 98.2 | 1.29 | 2.05 | 1.6 |
| 4 | SPAN ™ 85, new | 0.26 | 10.4 | 4.59 | 5.15 | 1.12 |
| 5 | SPAN ™ 80, new | 0.06 | 86.3 | 0.9 | 1.52 | 1.7 |
| 6 | EXXOSOL | 0.41 | 89.2 | 0.85 | 1.46 | 1.73 |
| 7 | ETHYLAN 25-3, old | 0.274 | 95.6 | 0.47 | 1.03 | 2.2 |
| 8 | ETHYLAN 25-3, new | 0.274 | 94.8 | 1.38 | 2.03 | 1.47 |
| 9 | AMADOL ®, old | 0.224 | 28.1 | 2.84 | 3.2 | 1.13 |
| 10 | AMADOL ®, new | 0.224 | 24.4 | 2.34 | 2.87 | 1.23 |
| 11 | AMADOL ®, new | 0.112 | 100 | 2.52 | 3.11 | 1.23 |
| 12 | AMADOL ®, new | 0.056 | 100 | 2.91 | 3.57 | 1.23 |
| 13 | AMADOL ®, new | 0.448 | 85.4 | 0.83 | 1.57 | 1.9 |
| 14 | AMADOL ®, new | 0.336 | 16.0 | 0.65 | 1.43 | 2.22 |

Figure 2:
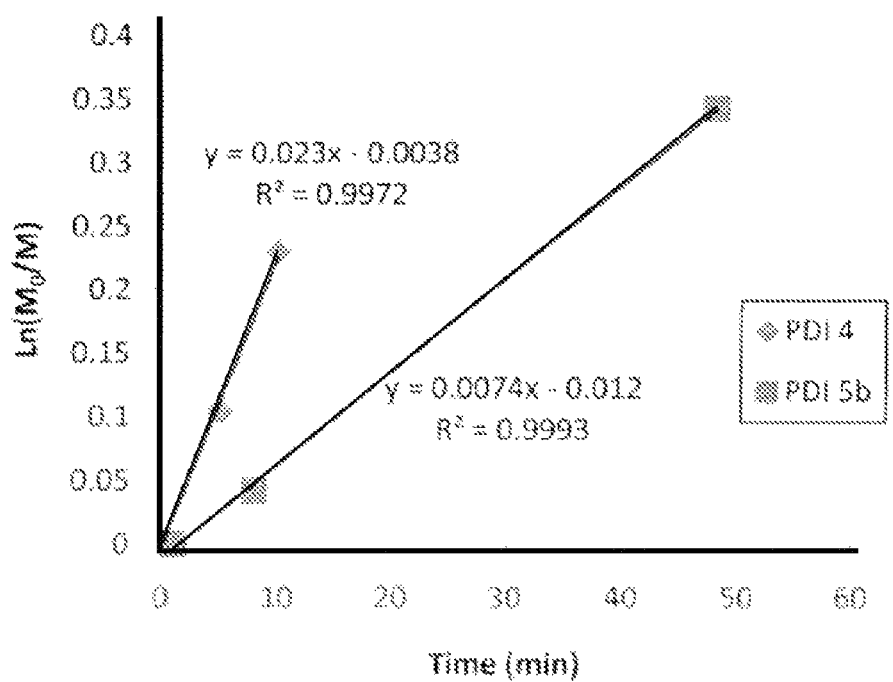
FIG. 2 shows a plot that represents a polymerization reaction as described in Example 1.

Reactions 1 (diamond) and 2 (square) shown in FIG. 2 were further analyzed by looking at the disappearance of monomer over time. FIG. 2 plots the Ln (monomer$_o$/monomer$_i$) versus time, where monomer$_o$ represents the concentration of monomers that have disappeared and monomer$_i$ represents the initial concentration of monomers. The linearity of the plots suggests that these reactions are living or quasi-living systems.

To further understand the mechanism of the polymerization reactions, the chain transfer agent (e.g., the surfactants in Example 1) was preemptively reacted with the polymerization initiator. In this case, the amount of polymerization initiator used is about 10-fold in excess of the polymerization initiator in a typical polymerization reaction. This reaction was then extracted into dichloromethane, and concentrated to dryness. 1H NMR analysis showed a significant change in the methylene peaks in the chain transfer agent, suggesting that the long chain fatty portion of the chain transfer agent is not needed for the polymerization reaction. Thus, it is believed that the only thing necessary for the polymerization reaction to be controlled is the di(methylalcohol)amide portion and a radical initiator.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A cementing fluid for use in a subterranean formation comprising:
    a base fluid;
    cement; and
    a polyacrylate brush polymer obtained from a polymerization reaction wherein the polyacrylate brush polymer has a molecular weight of at least about 500,000 and a polydispersity index of about 1.25 or less.

2. The cementing fluid of claim 1 wherein the polyacrylate brush polymer has a molecular weight of no more than about 5,000,000.

3. The cementing fluid of claim 1 wherein the polyacrylate brush polymer is a copolymer derived from two or more monomers.

4. The cementing fluid of claim 1 wherein the polyacrylate brush polymer is obtained from the polymerization reaction of an acrylate-based monomer and a non-acrylate-based monomer, wherein the non-acrylate-based monomer is a styrene, a vinyl, an olefin, or any combination thereof.

5. The cementing fluid of claim 4 wherein the acrylate-based monomers used in the polymerization reaction are selected from the group consisting of: an acrylamide, an acrylic acid, a methacrylic acid, an ethacrylic acid, a methyl methacrylate, a methacrylate, an acrylonitrile, a methyl acrylate, an ethyl acrylate, a 2-ethylhexyl acrylate, a hydroxyethyl methacrylate, a butyl acrylate, a butyl methacrylate, an acrylate ester, an acrylamide amide, and any combination thereof.

6. A subterranean fluid comprising:
    a base fluid; and
    proppant coated with a polyacrylate brush polymer that has a molecular weight of at least about 500,000 and a polydispersity index of about 1.25 or less.

7. The subterranean fluid of claim 6 wherein the molecular weight of the polyacrylate brush polymer is no more than about 5,000,000.

8. The subterranean fluid of claim 6 wherein the subterranean fluid is a fracturing fluid or a drilling fluid.

9. The subterranean fluid of claim 6 wherein the base fluid is aqueous, oil-based, or synthetic.

10. The subterranean fluid of claim 6 further comprising an additive selected from the group consisting of: a fluid loss control agent, a clay inhibitor, a lubricant, a weighting agent, a bentonite-based viscosifier, and any combination thereof.

11. The subterranean fluid of claim 6 wherein the polyacrylate brush polymer is obtained from the polymerization reaction of an acrylate-based monomer and a non-acrylate-based monomer, wherein the non-acrylate-based monomer is a styrene, a vinyl, an olefin, or any combination thereof.

12. The subterranean fluid of claim 11 wherein the acrylate-based monomers used in the polymerization reaction are selected from the group consisting of: an acrylamide, an acrylic acid, a methacrylic acid, an ethacrylic acid, a methyl methacrylate, a methacrylate, an acrylonitrile, a methyl acrylate, an ethyl acrylate, a 2-ethylhexyl acrylate, a hydroxyethyl methacrylate, a butyl acrylate, a butyl methacrylate, an acrylate ester, an acrylamide amide, and any combination thereof.

* * * * *